(12) United States Patent
Lee et al.

(10) Patent No.: US 11,475,437 B2
(45) Date of Patent: Oct. 18, 2022

(54) METHOD AND APPARATUS FOR MANAGING SUBJECT DATA BASED ON BLOCK CHAIN

(71) Applicant: SUNGSHIN WOMEN'S UNIVERSITY R&D FOUNDATION, Seoul (KR)

(72) Inventors: Il-Gu Lee, Seoul (KR); JiHyun Nam, Seoul (KR); Sunjae Lee, Seoul (KR)

(73) Assignee: SUNGSHIN WOMEN'S UNIVERSITY R&D FOUNDATION, Seoul (KR)

( * ) Notice: Subject to any disclaimer, the term of this patent is extended or adjusted under 35 U.S.C. 154(b) by 356 days.

(21) Appl. No.: 16/418,299

(22) Filed: May 21, 2019

(65) Prior Publication Data
US 2019/0354967 A1    Nov. 21, 2019

(30) Foreign Application Priority Data
May 21, 2018 (KR) .......................... 10-2018-0057979

(51) Int. Cl.
*G06Q 20/38* (2012.01)
*G06F 16/182* (2019.01)
(Continued)

(52) U.S. Cl.
CPC ....... *G06Q 20/382* (2013.01); *G06F 16/1824* (2019.01); *G06F 16/1834* (2019.01); *H04L 9/0643* (2013.01); *H04L 9/50* (2022.05); *H04L 2209/56* (2013.01)

(58) Field of Classification Search
None
See application file for complete search history.

(56) References Cited

U.S. PATENT DOCUMENTS

| 10,990,693 B1* | 4/2021 | Newman .............. G06F 21/6227 |
| 2017/0005804 A1* | 1/2017 | Zinder ................ G06F 21/6254 |

(Continued)

FOREIGN PATENT DOCUMENTS

KR    10-2018-0041055 A    4/2018

OTHER PUBLICATIONS

Hossein Shafagh et al., "Towards Blockchain-based Auditable Storage and Sharing of IoT Data", Nov. 14, 2017 (Year: 2017).*

(Continued)

*Primary Examiner* — Jacob C. Coppola
*Assistant Examiner* — Timothy Paul Sax
(74) *Attorney, Agent, or Firm* — Invenstone Patent, LLC

(57) ABSTRACT

Provided are a method and an apparatus for management of a block-chain-based subject data according to an exemplary embodiment of the present disclosure. A block-chain-based subject data management method which is performed by a processor of a subject data management apparatus includes: creating subject data in accordance with a request of a user device; creating first metadata related to the subject data; creating a first block including the created first metadata to store the first block in a block chain included in the subject data management apparatus; creating first code information based on information included in the first block; and storing the created first code information and the subject data in a database, and the first code information is used as address information of the database in which the subject data is stored.

10 Claims, 7 Drawing Sheets

(51) Int. Cl.
H04L 9/06 (2006.01)
H04L 9/00 (2022.01)

(56) References Cited

U.S. PATENT DOCUMENTS

| | | | |
|---|---|---|---|
| 2017/0264428 A1* | 9/2017 | Seger, II | H04L 9/32 |
| 2018/0089638 A1* | 3/2018 | Christidis | G06Q 10/0639 |
| 2018/0227119 A1* | 8/2018 | Bibera | H04L 63/083 |
| 2019/0013948 A1* | 1/2019 | Mercuri | G06F 16/27 |
| 2019/0268141 A1* | 8/2019 | Pandurangan | H04L 9/0637 |
| 2019/0279241 A1* | 9/2019 | DiTomaso | G06F 16/2255 |

OTHER PUBLICATIONS

Office Action for Korean Application No. 2019-0058756 dated Jun. 24, 2020; 5 pages.

Office Action for Korean Application No. 2019-0058756 dated Jun. 24, 2020; 5 pages. (Machine Translation).

Hyberledger Fabric. "Architecture Explained". <https://hyperledger-fabric.readthedocs.io/en/release-1.4/arch-deep-dive.html> (2017); 9 pages.

Sin DaHye and Lee JongHyeop. "Smart Contract Security for Pin-Tech." The Information Process Journal, the vol. 22, pp. 54-62 (2015); 9 pages.

Sin DaHye and Lee JongHyeop. "Smart Contract Security for Pin-Tech." The Information Process Journal, the vol. 22, pp. 54-62 (2015); 9 pages. (Machine Translation).

Office Action for Korean Application No. 2019-0058756 dated Dec. 30, 2020; 5 pages.

Office Action for Korean Application No. 2019-0058756 dated Dec. 30, 2020; 5 pages. (Machine Translation).

\* cited by examiner

METHOD AND APPARATUS FOR MANAGING SUBJECT DATA BASED ON BLOCK CHAIN

CROSS-REFERENCE TO RELATED APPLICATIONS

This application claims the priority of Korean Patent Application No. 10-2018-0057979 filed on May 21, 2018 in the Korean Intellectual Property Office, the disclosure of which is incorporated herein by reference.

BACKGROUND

Field

The present disclosure relates to a method and an apparatus for managing subject data based on a block chain.

Description of the Related Art

Generally, a block chain technology is a technology which distributes specific data or transaction histories to a large number of participating nodes which configure a network, rather than a centralized database to jointly manage the data or the transaction histories. The block chain technology has advantages of preventing forgery or falsification of specific data or transaction histories and ensuring integrity, confidentiality, and availability of stored information.

However, according to the block chain technology of the related art, all participating nodes of the network need to store and verify the decentralized ledger and a block size which can be stored in each node is limited so that there is a limitation in the scalability of a storage speed and a storage size.

Therefore, a method for storing and managing a large amount of data by complementarily using a centralized database and the block chain technology of the related art is required.

SUMMARY

An object to be achieved by the present disclosure is to provide a method and an apparatus for managing subject data based on a block chain.

Specifically, an object to be achieved by the present disclosure is to provide a method and an apparatus for managing subject data by complementarily utilizing a centralized database and a block chain technology.

Objects of the present disclosure are not limited to the above-mentioned objects, and other objects, which are not mentioned above, can be clearly understood by those skilled in the art from the following descriptions.

According to an aspect of the present disclosure, a method and an apparatus for managing subject data based on a block chain are provided. A block-chain-based subject data management method which is performed by a processor of a subject data management apparatus includes: creating subject data in accordance with a request of a user device; creating first metadata related to the subject data; creating a first block including the created first metadata to store the first block in a block chain included in the subject data management apparatus; creating first code information based on information included in the first block; and storing the created first code information and the subject data in a database, the first code information is used as address information of the database in which the subject data is stored.

According to another aspect of the present disclosure, an apparatus for managing subject data based on a block chain includes: a communication unit; a storing unit configured to store a block chain; and a processor which is configured to be operably connected to the communication unit and the storing unit, the processor is configured to create subject data in accordance with a request of a user device; create first metadata related to the subject data; create a first block including the created first metadata to store the first block in the block chain; create first code information based on information included in the first block; and store the created first code information and the subject data in a database, and the first code information is used as address information of the database in which the subject data is stored.

Other detailed matters of the embodiments are included in the detailed description and the drawings.

According to the present disclosure, in order to store and manage data, a centralized database and a block chain technology are complementarily utilized to ensure the integrity, the confidentiality, and the availability of data.

Further, according to the present disclosure, major information related to creation, modification, transaction, or contract of subject data is stored in the block chain and actual subject data is stored in a centralized database, thereby ensuring transparency and security of data.

Further, according to the present disclosure, peer to peer (P2P) transaction or contract between users using a smart contract is allowed so that a data processing speed is high and a management cost is saved.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
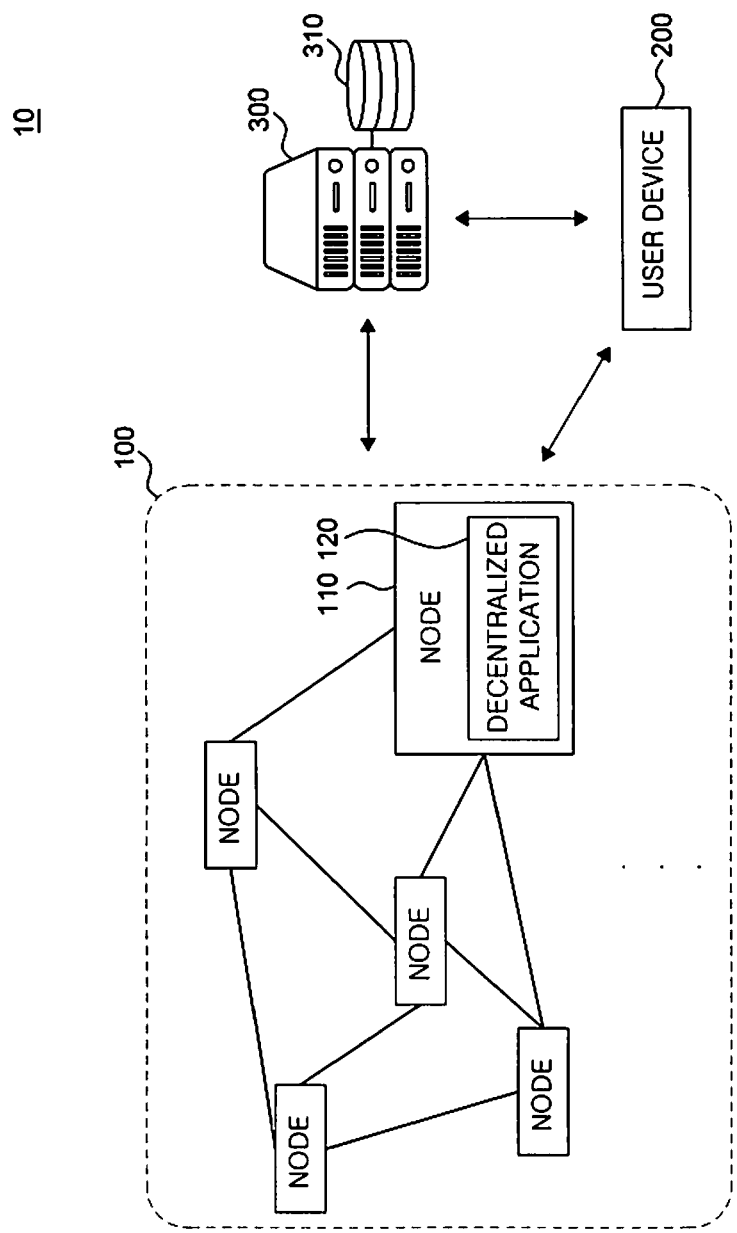
FIG. 1 is a schematic view for explaining a block-chain-based subject data management system according to an exemplary embodiment of the present disclosure.

Advantages and characteristics of the present invention and a method of achieving the advantages and characteristics will be clear by referring to exemplary embodiments described below in detail together with the accompanying drawings. However, the present invention is not limited to the following exemplary embodiments but may be implemented in various different forms. The exemplary embodiments are provided only to complete the disclosure of the present invention and to fully provide a person having ordinary skill in the art to which the present invention pertains with the category of the disclosure, and the present invention will be defined by the appended claims.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

The features of various embodiments of the present disclosure can be partially or entirely bonded to or combined with each other and can be interlocked and operated in technically various ways understood by those skilled in the art, and the embodiments can be carried out independently of or in association with each other.

In this specification, an operation of writing to a decentralized ledger may refer to an operation of creating a block and storing the created block in a block chain.

In this specification, an operation of creating a block may refer to an operation in which a temporary block is created, and an actual block is created after verification by an action such as a proof of work.

In this specification, a block of the block chain may be created in accordance with a predetermined time and information related to specific data may be included in the same block or different blocks, and it is not limited thereto.

In this specification, an operation included in the block may refer to an operation written in a header of the block or a body of the block.

In this specification, an electronic wallet of a user or the other user may be registered in a block chain distributed network in advance.

In this specification, an operation of creating a smart contract may include an operation that digital signature for the smart contract is conducted.

In this specification, all transactions performed by executing the smart contract may be written and stored in a decentralized ledger.

Hereinafter, various exemplary embodiments of the present disclosure will be described in detail with reference to accompanying drawings.

FIG. 1 is a schematic view for explaining a block-chain-based subject data management system according to an exemplary embodiment of the present disclosure.

Referring to FIG. 1, a block-chain-based subject data management system 10 is a system which manages subject data and metadata related to the subject data based on a block chain or ethereum and includes a block chain distributed network 100, a storage server 300 which stores subject data, and a user device 200 which requests creation, modification, transaction, or contract for the subject data. Here, the subject data includes intellectual property document data, public administration document data, confidential document data, or Internet-of-things data, but is not limited thereto and may include various data.

First, the block chain distributed network 100 may be a peer to peer (P2P) distributed network configured by a plurality of nodes which stores a decentralized ledger. The plurality of nodes communicates with each other and stores a decentralized ledger related to the subject data. When the decentralized ledger is created in at least one of the plurality of nodes, the created decentralized ledger may be shared by the plurality of nodes.

In the node 110 connected to the block chain distributed network 100, a block chain or ethereum based decentralized application (hereinafter, simply referred to as a "decentralized application") for providing various services based on the block chain or ethereum may be implemented. Here, various services include services for creating, modifying, or fulfilling a transaction of the subject data. The service includes a service for creating, filing, registering intellectual property document data, and transferring an ownership of intellectual property document data, a service for creating, storing, modifying, deleting public administration document data or confidential document data, and transferring a right for public administration document data or confidential document data, or a service for collecting and accessing Internet-of-things data, but is not limited thereto. The smart contract may be used for a transaction or contract service such as transfer of ownership or transfer of right.

The block chain or ethereum based application implemented in the node 110 may be a decentralized application (Dapp) which operates on a public block chain platform such as ethereum but is not limited thereto. Various applications or programs which operate on the block chain platform may be used therefor.

The node 110 may be any one of a plurality of participating nodes which may participate in activities related to the block chain or ethereum.

The decentralized application 120 implemented in the node 110 creates subject data by the user device 200 (or in accordance with a request of the user device) and creates metadata (hereinafter, referred to as first metadata) based on the created subject data. Here, the first metadata may include at least some of an owner, a title, a number, a keyword, a category of subject data, and time information when the subject data is created, but is not limited thereto and include major data related to the subject data.

The decentralized application 120 writes the created first metadata in the decentralized ledger to store the first metadata in a storing unit of the node 110. For example, the decentralized application 120 creates a block (hereinafter, referred to as a "first block") including the first metadata and stores the created first block in the storing unit of the node 110. For example, the first block may be stored in a block chain stored in the storing unit of the node 110.

The decentralized application 120 creates code information (hereinafter, referred to as "first code information") based on information included in the first block and transmits the first code information and the subject data to the storage server 300 so as to use the created first code information as address information of the database 310 of the storage server 300 in which the subject data is stored. According to various exemplary embodiments, the decentralized application 120 transmits the subject data to the storage server 300 and designates the first code information as address information of the database 310 in which the subject data is stored. For example, the decentralized application 120 for creating the first code information may use a hash value of the subject data which is calculated using a hash function or a hash algorithm and time information (for example, a time stamp) when the subject data is created. The first code information may serve to link a decentralized ledger in which metadata is written by an address wrapper which maps to the first code information to the database 310 in which the subject data is stored.

The decentralized application 120 writes the corresponding first code information in the decentralized ledger to store the first code information in the storing unit of the node 110.

The decentralized ledger or the block may be shared through a proof of work of other nodes which is connected to the node 110 by the block chain distributed network 100.

According to various exemplary embodiments, the decentralized application 120 maintains a storage reservation state for a predetermined period before storing the metadata in the block chain and when a storage condition is satisfied, stores the metadata in the block chain. If there is a reason for modification or deletion of metadata during the corresponding period, the decentralized application 120 may modify or delete the metadata which is reserved to be stored.

According to various exemplary embodiments, when the subject data is modified (or updated) by the user device 200, the decentralized application 120 may create metadata (hereinafter, referred to as second metadata) based on the modified subject data. Here, the second metadata may include at least some of a title, a number, a keyword, and a category of the modified subject data and time information when the subject data is modified but is not limited thereto.

The decentralized application 120 writes the created second metadata in the decentralized ledger to store the second metadata in the storing unit of the node 110. For example, the decentralized application 120 creates a block (hereinafter, referred to as a "second block") including the second metadata and stores the created second block in the block chain stored in the storing unit of the node 110.

The decentralized application 120 creates code information (hereinafter, referred to as "second code information") based on information included in the second block and allows the created second code information to be used as address information of the database 310 of the storage server 300 in which the modified subject data is stored. For example, the decentralized application 120 may create second code information using the hash value of the modified subject data which is calculated using the hash function or the hash algorithm and the time information when the subject data is modified. The decentralized application 120 may modify the address information including the second code information to address information of the database 310 in which the modified subject data is stored or connect the address information including the second code information to the public administration document data which is modified and stored in the database 310. The decentralized application 120 may write the corresponding second code information in the decentralized ledger to store the second code information in the storing unit of the node 110.

The decentralized ledger or the block may be shared by the other nodes which are connected to the node 100 by the block chain distributed network 100.

As described above, the metadata stored in the block chain is connected to the subject data which is stored in the database 310 through the code information so that the user may search or manage the metadata stored in the block chain or the subject data related to the metadata through the decentralized application 120.

According to various exemplary embodiments, the decentralized application 120 creates a smart contract related to the subject data in accordance with the request of the user device 200 and creates a block including the created smart contract to store the block in the storing unit of the node 110. Here, the smart contract is a program which is configured to fulfill a transaction or a contract in accordance with a transaction or contract condition related to the subject data. When the established transaction or contract condition is satisfied, an operation corresponding to the transaction or contract contents in accordance with the condition may be automatically performed. For example, the transaction or contract condition may be a condition for payment with cryptocurrency to fulfill the transaction or contract but is not limited thereto and various transaction or contract conditions may be used other than the cryptocurrency transaction. The smart contract created as described above may include an electronic wallet address of the user who creates the transaction or contract related to the subject data, the transaction or contract condition, and information on the transaction or contract contents which are performed when the transaction or contract condition is satisfied. Generally, the smart contract does not include the address information of the subject of the transaction or contract, but in the exemplary embodiment of the present disclosure, the address information of the subject of the transaction or contract may be included. In this case, the private transaction or contract between specific users may be made.

When an operation corresponding to the transaction or contract condition is performed, the decentralized application 120 performs the operation corresponding to the transaction or contract contents of the smart contract and writes information of fulfilled contract history or fulfilled contract result in the decentralized ledger to be stored in the storing unit of the node 110.

For example, the decentralized application 120 create a smart contract for ownership transfer contract in accordance with the request of the user device 200 and creates a block including the created smart contract to store the block in the storing unit of the node 110. Here, the created smart contract may include an electronic wallet address of a user "A" which requests the ownership transfer of the subject data, a contract condition for payment with a cryptocurrency for a specific amount from the other user "B" who transfers the ownership for the subject data, and information on contract contents that the ownership for the subject data will be transferred to "B" when the contract condition is satisfied. In this case, the smart contract may further include an electronic wallet address of the other user "B".

When the cryptocurrency for a specific amount is paid by the other user "B", the decentralized application 120 may change ownership information for the subject data stored in the database 310 of the storage server 300. Specifically, the decentralized application 120 may confirm whether the cryptocurrency for the specific amount is paid to the electronic wallet of the user "A" from the other user "B" and when the cryptocurrency for the specific amount is paid from the other user "B", perform the operation in accordance with the contract contents.

The decentralized application 120 creates metadata based on the changed ownership information, creates a block including the created metadata to store the created block in the storing unit of the node 110. For example, the decentralized application 120 may change information on the owner of the ownership document data for the subject data to information on "B".

The decentralized application 120 creates code information based on information included in the created block and designates the created code information as address information of the database 310 in which the changed ownership information is stored or transmits the created code information to the storage server 300 to cause the storage server 300 to designate the code information as the address information of the changed ownership information. The decentralized application 120 writes the corresponding code information in the decentralized ledger to store the code information in the storing unit of the node 110. In the proposed exemplary embodiment, an operation of changing the ownership of the subject data has been described, but the present disclosure is not limited thereto and the operation for the right assignment or grant of the license for the subject data may also be similarly performed as described above.

According to various exemplary embodiments, when the transaction or contract request related to the subject data is received from the user device 200, the decentralized application 120 may request a transaction or contract subject device (not illustrated) corresponding to the subject of the transaction or contract to create a smart contract related to the subject data. When the smart contract is created by the device of the transaction or contract subject, the decentralized application 120 creates a block including the created smart contract to store the block in the storing unit of the node 110.

When an operation corresponding to the contract condition of the smart contract is performed, the decentralized application 120 performs the operation corresponding to the contract contents of the smart contract and writes information on the fulfilled contract history or fulfilled contract result in the decentralized ledger to be stored in the storing unit of the node 110.

For example, when a filing request for the application document data is received from the user device 200, the decentralized application 120 requests a server of the patent office (not illustrated) to create the smart contract for filing. In the proposed exemplary embodiment, the subject data management system 10 may further include the patent office server.

When the smart contract for filing is created by the patent office server, the decentralized application 120 creates a block including the created smart contract to store the block in the storing unit of the node 110. Here, the smart contract created by the patent office server may include an electronic wallet address of the patent office, a contract condition for payment with a cryptocurrency corresponding to a filing fee by the user of the user device 200, and information on the contract contents for filing the application document data when the contract condition is satisfied. In this case, the smart contract may further include the information on the electronic wallet address of the user.

When the cryptocurrency corresponding to the filing fee is paid by the user, the decentralized application 120 creates metadata based on the application document data and creates a block including the created metadata to store the block in the storing unit of the node 110. Here, the metadata may include at least some of a title, a category, a keyword, an application number, an application data, applicant information, inventor information, a filing fee, an abstract of the invention, and an invention feature of application document data. The decentralized application 120 confirms the electronic wallet of the user or the electronic wallet of the patent office using the electronic wallet address information of the user or the electronic wallet address information of the patent office to confirm the payment with cryptocurrency corresponding to the filing fee.

The decentralized application 120 creates code information to be used as address information of the database 310 in which the intellectual property document data is stored based on information included in the created block and transmits the created code information and application document data to the storage server 300 to designate the code information as the address information of the application document data stored in the database 310. For example, the decentralized application 120 may create the code information using a hash value of the application document data created by the hash function or the hash algorithm and a filing time (for example, a time stamp) of the application document data. The decentralized application 120 writes the created code information in the decentralized ledger to store the code information in the storing unit of the node 110.

According to various exemplary embodiments, when a consumer of the subject data sells the subject data or the request for a license agreement is received, the decentralized application 120 calculates the value of the subject data based on evaluation information of the subject data and creates a smart contract in accordance with the calculated value. For example, the decentralized application 120 determines a cost for sales or the license agreement of the subject data in accordance with the evaluation information of the subject data. Here, the evaluation information may be information obtained by evaluating the subject data by a provider, a consumer, an examiner, or percipients of the subject data.

When the electronic signature for the smart contract created by the consumer and the provider is completed, the decentralized application 120 creates a block including the smart contract and stores the created block in the block chain. When the transaction condition of the smart contract is fulfilled by the consumer, the decentralized application 120 may perform the operation for sales or the license agreement for the subject data. For example, the decentralized application 120 creates document data for the sales contract of the subject data and creates metadata based on the created sales contract document data. Thereafter, the decentralized application 120 creates a block including the created metadata and stores the created block in the block chain. The decentralized application 120 creates code information based on the information included in the created block and transmits the created code information and the sales contract document data to the storage server 300 so as to designate the created code information as address information of the database 310 in which the sales contract document data is stored.

According to various exemplary embodiments, the evaluation information for the subject data may be determined by a provider, a consumer, an examiner, and participants of the subject data for an entire lifecycle of the subject data. The evaluation information determined as described above may be reevaluated by a group of experts consisting of reliable experts and reputable participants. The participants who evaluate the subject data may receive incentives (for example, paid with cryptocurrency) or penalties (for example, restriction on participation) by the reputation.

According to the method for managing subject data using the decentralized application as described above, the smart contract is created to generate an access authority to the trade secret only when a minimum quorum for accessing the trade secret using a multiple signature key such as a smart contract is satisfied, thereby managing an encrypted trade secret. Further, the smart contract is created by P2P for the purpose of contract for the subject data and the transfer of the subject data or grant of the license may be performed in real time. This ensures reasonable royalty of the subject data in accordance with the contract condition and time and a maintenance fee and a registration fee of the subject data may be paid by the smart contract established by a trusting authority (for example, the patent office) which manages the database and the block chain. Further, when the subject data is application document data, the lifecycle of the application document data may be managed using a standardized smart contract from the filing to the termination. For example, only when the applicant deposits the filing fee in accordance with the contract condition of the smart contract, the status is transferred to a next lifecycle to maintain the right for the application document data.

According to various exemplary embodiments, when the subject data is public administration document data which is served by a client-server web structure, a method for managing the subject data by the decentralized application 120 will be described in detail below. In this case, in the exemplary embodiment which will be described below, only the environment to which the management subject and the system are applied may be different from that of the above-described exemplary embodiment, but the basic management method may be the same as the above-described exemplary embodiment. In the proposed exemplary embodiment, the subject data management system 10 may further include a public administrative server (not illustrates) which provides a public administrative service.

The decentralized application 120 creates public administration document data and creates metadata related to the created public administration document data and then creates a block including the created metadata and stores the created block in the block chain. The decentralized application 120 creates code information based on the information included in the block and transmits the created code information and the public administration document data to the public administrative server to use the created code information as address information of a centralized database (for example, the database 310) in which the public administration document data is stored. In this case, the code information may be connected to the public administration document data stored in the database 310 through the address wrapper which maps thereto. By doing this, the user accesses the decentralized application 120 using the user device 200 to perform the operation such as registration, right assignment, and evaluation of the public administration document data through the decentralized application 120.

Specifically, the decentralized application 120 creates the public administration document data by the user device 200 and stores the created public administration document data in the database 310 and evaluates the stored public administration document data. The public administration document data may be evaluated by evaluation items such as whether to comply with a format of a public administration document or whether to write the public administration document with the correct sentence. In other words, the decentralized application 120 may evaluate the public administration document data based on the evaluation item information as described above.

When the public administration document data is modified (or updated) by the user device 200, the decentralized application 120 creates metadata for the modified public administration document data and creates a block including the created metadata to store the created block in the block chain. Here, the metadata may include a document number, a keyword or a category of the public administration document data but is not limited thereto.

The decentralized application 120 creates code information based on the information included in the block and connects the created code information to the address information of the database 310 in which the modified public administration document data is stored. Here, the code information may be created using a hash value for the modified public administration document data and time information (for example, a time stamp) when the public administration document data is modified. For example, the decentralized application 120 may modify the address information including the created code information to address information of the database 310 in which the modified public administration document data is stored or connect the address information including the created code information to the public administration document data which is stored in the database 310 through a public network.

According to various exemplary embodiments, when the user device 200 requests the registration of the public administration document data, the decentralized application 120 creates metadata related to the public administration document data and creates a block including the created metadata to store the created block in the block chain. The decentralized application 120 transmits the public administration document data to the public administrative server. In this case, the decentralized application 120 creates code information based on the information included in the block and connects the created code information to the address information of the database 310 in which the public administration document data is stored.

When the registration is determined by examination (for example, whether to comply with a document format or whether to write a correct sentence) of participants of the public administrative system, the decentralized application 120 may update the state information for the public administration document data. Here, the operation of updating the state information may include operations of updating registration information for the public administration document data and writing the registration information in the decentralized ledger by the decentralized application 120.

The decentralized application 120 creates a smart contract for a contract for registering the public administration document data and when the contract condition of the created smart contract is satisfied, performs a registration procedure for the public administration document data.

According to various exemplary embodiments, when a writing right assignment is requested by an existing writing authority of the public administration document data of the related art, the decentralized application 120 may create the smart contract for transfer of the writing right of the public administration document data. When the electronic signature of the existing writing authority and a new authorized subject is completed, the decentralized application 120 creates a block including the created smart contract and stores the created block in the block chain. Thereafter, when approval for transfer of the writing right is completed, the decentralized application 120 may perform an operation for the right assignment. For example, the approval for the right assignment may be established by exchange of a message or a value agreed in advance between the existing writing authority and the new authorized subject.

Specifically, the decentralized application 120 creates right assignment document data and creates metadata related to the created right assignment document data and then creates a block including the created metadata and stores the created block in the block chain. The decentralized application 120 creates code information based on the information included in the created block and transmits the created code information and the right assignment document data to the storage server 300 so as to use the created code information as address information of the database 310 in which the right assignment document data is stored. By doing this, the user may access the decentralized application 120 through the user device 200 to freely search or use the metadata stored in the block chain or the public administration document data stored in the database 310 through the decentralized application 120 or use an administrative service and evaluate a quality of the service or state comments in the P2P manner. According to various exemplary embodiments, the decentralized application 120 may determine evaluation information of the public administration document data by a writer, a registrant, and participants of the public administration document data for the entire lifecycle of the public administration document data. The evaluation information determined as described above may be reevaluated by a group of experts consisting of reliable experts and reputable participants. As described above, the participants who evaluate the subject data may receive incentives or penalties by the reputation.

According to various exemplary embodiments, the user who uses the public administrative service may create evaluation information (or reputation information) for the public administrative service by the decentralized application 120. By doing this, the participants of the public administrative system may receive incentives or penalties by the evaluation information (or reputation information) of the user.

As described above, according to the present disclosure, the incentive and penalty evaluation system for the public administrative service and the public administration document data is introduced to improve the quality of the public administrative service and the public administration document data.

According to various exemplary embodiments, when the subject data is confidential document data which requires security and protection within the company, a method for managing the subject data by the decentralized application 120 will be described in detail below. In this case, in the exemplary embodiment which will be described below, only the environment to which the management subject and the system are applied is different from that of the above-described exemplary embodiment, but the basic management method may be the same as the above-described exemplary embodiment. In the proposed exemplary embodiment, the subject data management system 10 may further include a confidentiality management server (not illustrates) which provides a confidentiality management service.

The decentralized application 120 creates confidential document data and creates metadata related to the created confidential document data and then creates a block including the created metadata and stores the created block in the block chain. The decentralized application 120 creates code information based on the information included in the block and transmits the created code information and the confidential document data to the confidentiality management server to use the created code information as address information of a centralized database (for example, the database 310) in which the confidential document data is stored. In this case, the code information may be connected to the confidential document data stored in the database 310 through the address wrapper which maps thereto. By doing this, the user accesses the decentralized application 120 using the user device 200 to perform the operation such as registration, reading, and evaluation of the confidential document data through the decentralized application 120.

Specifically, the decentralized application 120 creates the confidential document data by the user device 200, stores the created confidential document data in the database 310, reads and evaluates the stored confidential document data within an empowered right when the reading right is empowered. The confidential document data may be evaluated by the evaluation items such as whether to specify a protection period of the confidential document or whether to specify a storage place. In other words, the decentralized application 120 may evaluate the confidential document data based on the evaluation item information as described above.

When the confidential document data is modified (or updated) by the user device 200, the decentralized application 120 creates metadata for the modified confidential document data and creates a block including the created metadata to store the created block in the block chain. Here, the metadata may include a document number, a keyword or a category of the confidential document data but is not limited thereto.

The decentralized application 120 creates code information based on the information included in the block and connects the created code information to the address information of the database 310 in which the modified confidential document data is stored. Here, the code information may be created using a hash value for the modified confidential document data and time information (for example, a time stamp) when the confidential document data is modified. For example, the decentralized application 120 may modify the address information including the created code information to address information of the database 310 in which the modified confidential document data is stored or connect the address information including the created code information to the confidential document data which is modified and stored in the database 310, by a private network.

For example, when the confidential document data is reclassified by the user device 200, the decentralized application 120 may create smart contract including time information (for example, date) when the confidential document is reclassified and a ground for the reclassification. When the reclassification for the confidential document data is approved by confidentiality management participants, the decentralized application 120 may update the reclassification information for the corresponding confidential document data. Here, the operation of updating the reclassification information may include operations of updating reclassification information for the confidential document data stored in the database and writing the updated reclassification information in the decentralized ledger by the decentralized application 120.

According to various exemplary embodiments, when the user device 200 requests the registration of the confidential document data, the decentralized application 120 creates metadata related to the confidential document data and creates a block including the created metadata to store the created block in the block chain. The decentralized application 120 transmits the confidential document data to the confidentiality management server. In this case, the decentralized application 120 creates code information based on the information included in the block and connects the created code information to the address information of the database 310 in which the confidential document data is stored.

When the registration is determined by examination (for example, whether to create a protection period or whether to write a storage place) of participants of the confidentiality management system, the decentralized application 120 may update the state information for the confidential document data. Here, the operation of updating the state information may include operations of updating registration information for the confidential document data and writing the registration information in the decentralized ledger by the decentralized application 120.

The decentralized application 120 creates a smart contract for a contract for registering the confidential document data and when the contract condition of the created smart contract is satisfied, performs a registration procedure for the confidential document data.

According to various exemplary embodiments, when the user device 200 requests to read the confidential document data, the decentralized application 120 creates a smart contract for reading the confidential document data and confirms an access right to the created smart contract to determine whether the user who requests the reading has a reading right or has a right to read or write. For example, when the user who requests the reading has a reading right, the decentralized application 120 requests the reading of the confidential document data to the confidentiality authority server or reads the confidential document data stored in the database 310.

According to various exemplary embodiments, the decentralized application 120 creates a smart contract including a protection period and expiration date of the confidential document data created when the confidential document data is created and stores the smart contract in the block chain. For example, when the contract condition including the protection period and the expiration date of the confidential document data and the protection period are expired or the protection date reaches a destruction date, the created smart contract may include contract contents to destroy the confidential document data or converts (or classifies) the confidential document data to a non-confidential document data. When the protection period is expired so that the protection date matches the destruction date, the decentralized application 120 destroys the confidential document data or converts the confidential document data into the non-confidential document data.

By doing this, according to the present disclosure, the lifecycle of the confidential document may be managed by the standardized smart contract from creation of the confidential document to expiration of the protection period or destruction.

Next, the user device 200 may include a personal computer, a notebook computer, or a portable terminal (for example, a smart phone or a tablet PC) as a device which provides a user interface to be connected to the decentralized application 120 implemented in the node 110. Here, the user interface may be a web browser to be connected to the decentralized application 120 implemented in the node 110 but is not limited thereto and various interfaces to be connected to the decentralized application 120 may be used.

The user device 200 accesses the decentralized application 120 through the user interface to request creation, modification, transaction or contract for the subject data or creates a smart contract for the transaction or contract or performs cryptocurrency transaction in accordance with the smart contract.

For example, the user device 200 may request the decentralized application 120 to create or modify the subject data or create a smart contract for the transaction or contract for the subject data. According to various exemplary embodiments, the user device 200 may be provided with information on a smart contract created by the other user through the decentralized application 120 or perform an operation corresponding to the transaction or contract condition of the smart contract. As described above, according to the present disclosure, the block chain and the centralized database interwork with each other using the decentralized application 120 to save the time and cost used to manage the subject data and trade secret protection, right assignment of the subject data, and grant of a license may be allowed using the smart contract.

Next, the storage server 300 includes a database 310 which is a centralized database, receives the subject data by means of the decentralized application 120 implemented in the node 110, and stores the received subject data in the database 310. Specifically, when the subject data and the code information are received by the decentralized application 120, the storage server 300 stores the subject data in the database 310 and designates the code information as address information of the database 310 in which the subject data is stored.

When the subject data is modified by the decentralized application 120, the storage server 300 may store the modified subject data in the database 310. When the code information for the modified subject data is received by the decentralized application 120, the storage server 300 may designate the received code information as address information of the modified subject data which is stored in the database 310.

According to various exemplary embodiments, the storage server 300 is implemented as a service providing server which provides a specific service to include a database or configured only by the database but is not limited thereto. For example, when the storage server 300 is implemented as a service providing server which provides a specific service, the storage server 300 may include a patent office server which provides services related to the intellectual property, a public administrative server which provides the public administration service, and a confidentiality management server which provides a confidentiality-related service or an Internet-of-things management server which provides the Internet-of-things related service, but is not limited thereto. In this case, the service providing server may include a centralized database and use a centralized database which is separately implemented. When the storage server 300 is implemented only by the database, the database 310 may be controlled by the decentralized application 120 implemented in the node 110.

By doing this, according to the present disclosure, the centralized database and the block chain technology are complementarily utilized for storage and management of the subject data to ensure the integrity, confidentiality, and availability for the data. Further, the processing speed for creation, modification, transaction, or contract of the subject data is increased to save the management cost.

Hereinafter, the node 110 will be specifically described with reference to FIG. 2.

Figure 2:
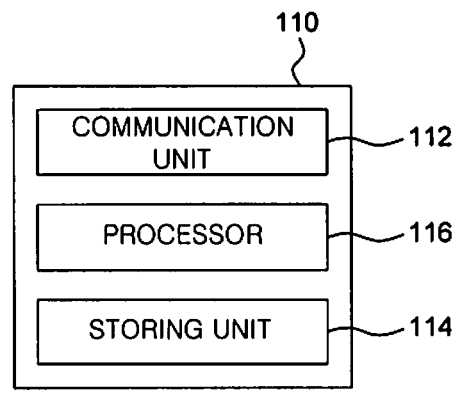
FIG. 2 is a schematic block diagram of a node according to an exemplary embodiment of the present disclosure.

FIG. 2 is a schematic block diagram of a node according to an exemplary embodiment of the present disclosure.

Referring to FIG. 2, the node 110 includes a communication unit 112, a storing unit 114, and a processor 116. In the proposed exemplary embodiment, the node 110 may include a hardware for implementing a participant node, a hardware for implementing the Dapp, a hardware for implementing a block-chain-based decentralized ledger, or a hardware for managing the centralized database (for example, a database 310). Further, in order to implement them, not all configuration of FIG. 2 may be included and general components which will not be mentioned below may also be added.

The communication unit 112 connects the node 110 to the other node of the block chain network 100 and the storage server 300 to communicate with each other. The communication unit 112 may transmit and receive various data with the other node connected to the block chain network 100. Specifically, the communication unit 112 may transmit the subject data and code information which may be used as the address information of the database 310 in which the subject data is stored, to the storage server 300.

The storing unit 114 may store various data used to provide a block-chain-based service such as creation, modification, transaction, and contract of the subject data. Specifically, the storing unit 114 may store a decentralized application for providing a block-chain-based service such as creation, modification, transaction, and contract of the subject data, a smart contract for transaction or contract, or a block chain in which a decentralized ledger or a block is stored.

The processor 116 may perform various commands for providing a block-chain-based service such as creation, modification, transaction, and contract of the subject data. Hereinafter, the operations performed by the processor 116 may be performed by the block-chain-based application.

When a request for creating the subject data is received from the user device 200 which accesses the block-chain-based application, the processor 116 may create subject data and create metadata based on the created subject data.

The processor 116 creates a block including the created metadata and stores the created block in the block chain stored in the storing unit 114. The processor 116 may create code information based on information included in the created block. For example, a block header of the created block may include a hash value of the subject data, a time stamp (for example, time information when the subject data is created) when an event for the subject data occurs, a nounce, or a hash value of a previous block. The processor 116 may create code information using the hash value of the subject data included in the block header and the time stamp when the event for the subject data occurs. The created code information may be a value obtained by connecting or coupling the hash value to the time stamp but is not limited thereto and may include other information than the hash value and the time stamp.

The processor 116 may transmit the created code information and the subject data to the storage server 300. For example, the processor 116 may designate the code information as address information of the database 310 of the storage server 300 in which the subject data is stored or transmit a request for designating the code information to the storage server 300.

The processor 116 may write the created code information in the decentralized ledger to be stored in the storing unit 114. For example, the processor 116 writes the created code information in a temporary block and when the block is created by the verification, stores the created block in the block chain stored in the storing unit 114.

According to various exemplary embodiments, when a request for modifying the subject data is received from the user device 200 which accesses the decentralized application, the processor 116 may modify at least some of the subject data stored in the database 310 of the storage server 300 or transmit the request for modification to the storage server 300.

The processor 116 creates metadata based on the modified subject data and creates a block including the created metadata to store the created block in the block chain stored in the storing unit 114. The processor 116 may create code information based on information included in the created block. For example, a block header of the created block may include a hash value of the modified subject data, a time stamp (for example, time information when the subject data is modified) when an event for the modified subject data occurs, a nounce, or a hash value for a previous block. The processor 116 may create code information using the hash value of the modified subject data included in the block header and the time stamp when the event for the modified subject data occurs.

The processor 116 may transmit the created code information and the modified subject data to the storage server 300. For example, the processor 116 may designate the code information as address information of the database 310 of the storage server 300 in which the modified subject data is stored.

The processor 116 may write the created code information in the decentralized ledger to be stored in the storing unit 114.

According to various exemplary embodiments, when a smart contract for the transaction or contract related to the subject data is created by the user device 200 which accesses the decentralized application, the processor 116 creates a block including the created smart contract and stores the created block in the block chain stored in the storing unit 114. For example, the created block may include the electronic wallet address of a user who creates a transaction or contract related to the subject data, a transaction condition or contract condition related to the subject data, or transaction contents or contract contents related to the subject data when the transaction condition or the contract condition is satisfied. As the block is created as described above, the smart contract may be distributed to other nodes connected to the block chain distributed network 100.

When an operation corresponding to the transaction condition or the contract condition related to the subject data is performed by the user device 200 through the decentralized application, the processor 116 performs the operation corresponding to the transaction contents or the contract contents related to the subject data and writes information on the fulfilled contract history or fulfilled contract result in the decentralized ledger to be stored in the storing unit 114.

For example, when the created smart contract is a smart contract for a contract for ownership transfer of the subject data, the smart contract may include an electronic wallet address of a user who creates a contract, a contract condition for payment with a cryptocurrency of a specific amount to the electronic wallet address of the user by a contract subject, and contract contents for changing an ownership of the subject data to the contract subject when the contract condition is satisfied.

When the operation corresponding to the contract condition of the contract subject is performed by the user device 200 through the decentralized application, the processor 116 updates ownership information related to the subject data stored in the database 310 of the storage server 300 and creates metadata based on the updated ownership information. Here, the operation corresponding to the contract condition may be an operation of paying a cryptocurrency corresponding to a specific amount to the electronic wallet address of the user by the contract subject.

The processor 116 creates a block including the created metadata to store the created block in the block chain stored in the storing unit 114. The processor 116 creates code information based on the information included in the created block and transmits the created code information to the storage server 300 to designate the code information as address information of the updated ownership information which is stored in the database 310. The processor 116 may write the created code information in the decentralized ledger to be stored in the storing unit 114.

According to various exemplary embodiments, when the transaction or contract request related to the subject data with a specific user is received from the user device 200 through the decentralized application, the processor 116 may request the specific user to create a smart contract related to the subject data. When the smart contract is created by the user device 200 of the specific user through the decentralized application, the processor 116 creates a block including the created smart contract and stores the created block in the block chain stored in the storing unit 114. Here, the created smart contract may include the electronic wallet address of the specific user, the contract condition, and the contract contents performed when the contract condition is satisfied. When the block is created as described above, the smart contract may be distributed to other nodes connected to the block chain distributed network 100.

When an operation corresponding to the transaction or contract conditions is performed by the user device 200 through the decentralized application, the processor 116 performs the operation corresponding to the transaction or contract contents and writes information on the fulfilled transaction or contract history or fulfilled transaction or contract result in the decentralized ledger to be stored in the storing unit 114. For example, when the user makes a payment with the cryptocurrency of a specific amount corresponding to the transaction condition to the electronic wallet of the specific user through the decentralized application, the processor 116 determines that the contract condition is satisfied and performs the operation such as creation, modification, transaction, and contract related to the subject data corresponding to the contract contents.

As described above, according to the present disclosure, the user performs the creation, modification, transaction, or contract of the subject data through the decentralized application, stores the metadata which is major information for the subject data in the block chain, and stores the subject data in the centralized database, thereby saving a cost for management of the subject data, increasing a processing speed, and ensuring the data integrity, security, and availability.

Hereinafter, the user device will be described in detail with reference to FIG. 3.

Figure 3:
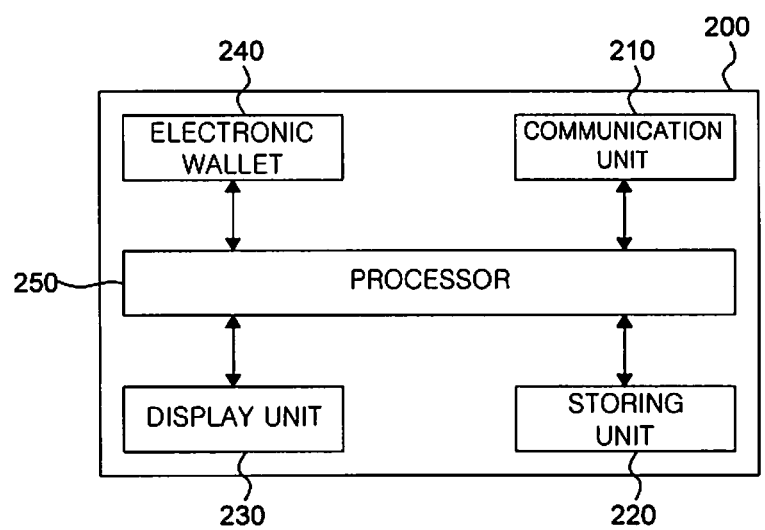
FIG. 3 is a schematic block diagram of a user device according to an exemplary embodiment of the present disclosure.

FIG. 3 is a schematic block diagram of a user device according to an exemplary embodiment of the present disclosure.

Referring to FIG. 3, the user device 200 includes a communication unit 210, a storing unit 220, a display unit 230, an electronic wallet 240, and a processor 250.

The communication unit 210 connects the user device 200 to communicate with the external device. The communication unit 210 may be connected to the node 110 which is connected to the block chain distributed network using wired/wireless communication to transmit and receive various information. Specifically, the communication unit 210 may request the node 110 to provide the block-chain-based service such as creation, modification, transaction, and contract of the subject data or receive various information related to the block-chain-based service.

The storing unit 220 may store various data used to use a block-chain-based service such as creation, modification, transaction, and contract of the subject data. Specifically, the storing unit 220 may access the decentralized application 120 implemented in the node 110 to store an application, a program, a widget, or a web browser for using the block-chain-based service.

According to various exemplary embodiments, the storing unit 220 may include at least one type of storage medium of flash memory type, hard disk type, multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The user device 200 may operate in association with a web storage which performs a storage function of the storing unit 220 on the Internet.

The display unit 230 may display various contents (for example, texts, images, videos, icons, banners, or symbols) to the user. Specifically, the display unit 230 may display an interface screen for an application, a program, a widget, or a web browser to be connected to the decentralized application 120. Specifically, the display unit 230 may display an interface screen for a block-chain-based service such as creation, modification, transaction, and contract of the subject data. For example, the display unit 230 may display the interface screen for creating the smart contract for a contract with the other user.

According to various exemplary embodiments, the display unit 230 may include a touch screen and for example, may receive touch, gesture, proximity, drag, swipe, or hovering input which uses an electronic pen or a part of a body of the user.

The electronic wallet 240 is a module for storing and using the cryptocurrency and may be a program installed in the user device 200. The electronic wallet 240 may be a hot wallet or a cold wallet but is not limited thereto.

The processor 250 is connected to the communication 210, the storing unit 220, the display unit 230, and the electronic wallet 240 to be operable and accesses the decentralized application implemented in the node 110 to perform various commands for using the block-chain-based service.

The processor 250 accesses the decentralized application 120 implemented in the node 110 using an application, a program, or a web browser, requests creation or modification of the subject data through the decentralized application 120 or creates a smart contract for the transaction or contract related to the subject data, or checks the smart contract related to the transaction or contract for the subject data.

For example, when the decentralized application 120 provides a service for filing, the processor 250 creates an application document data through the decentralized application 120 and transmits a filing request for the created application document data to the node 110. The processor 250 receives information on the created smart contract for filing by the patent office server from the node 110 through the decentralized application 120 and displays the interface screen representing the received information. For example, the interface screen may include the electronic wallet address of the patent office server, a contract condition for paying the cryptocurrency corresponding to the filing fee, and information on the contract contents which performs the filing when the contract condition is satisfied. The processor 250 may pay the cryptocurrency corresponding to the filing fee using the electronic wallet address of the patent office server through the decentralized application 120. According to various exemplary embodiments, the processor 250 accesses the information on the fulfilled contract history or result stored in the block chain of the node 110 through the decentralized application 120 to display the interface screen representing the information.

According to various exemplary embodiments, in order to search the smart contract related to the transaction or contract for the subject data through the decentralized application 120, the processor 250 transmits a query for searching the smart contract to the node 110 and receives a response for the query from the node 110. Here, the response for the query may include information on the smart contract for the transaction or contract for the subject data between the user and the other user. The smart contract may be any one of smart contracts stored in the block chain of the node 110.

The processor 250 performs an operation corresponding to the contract condition for the smart contract searched by the decentralized application 120 in accordance with the request of the user and displays the interface screen representing information on the fulfilled contract history or the fulfilled contract result. For example, the processor 250 may make a payment with the cryptocurrency of a specific amount corresponding to the contract condition using the electronic wallet address of the other user through the decentralized application 120 in accordance with the user's request. When the information on the fulfilled contract history or the fulfilled contract result is stored in the block chain by the node 110, the processor 250 accesses the information on the fulfilled contract history or the fulfilled contract result stored in the block chain of the node 110 through the decentralized application 120 to display the interface screen representing the information.

According to various exemplary embodiments, the processor 250 may display the interface screen for creating a smart contract for the transaction or contract with the other user through the decentralized application 120. For example, the interface screen may include an input interface for inputting the transaction or contract condition and the transaction or contract contents. By doing this, when the contract condition and the contract contents are input by the user, the processor 250 may transmit the information on the contract condition and the contract contents input through the decentralized application 120 to the node 110.

According to various exemplary embodiments, the processor 250 may display an interface screen for the electronic wallet of the user. The interface screen may include a user interface for check, deposit or withdrawal of the electronic wallet.

Hereinbelow, various modules which are executed on a block chain operating system of a node 110 for providing a block-chain-based service will be described in detail with reference to FIG. 4.

Figure 4:
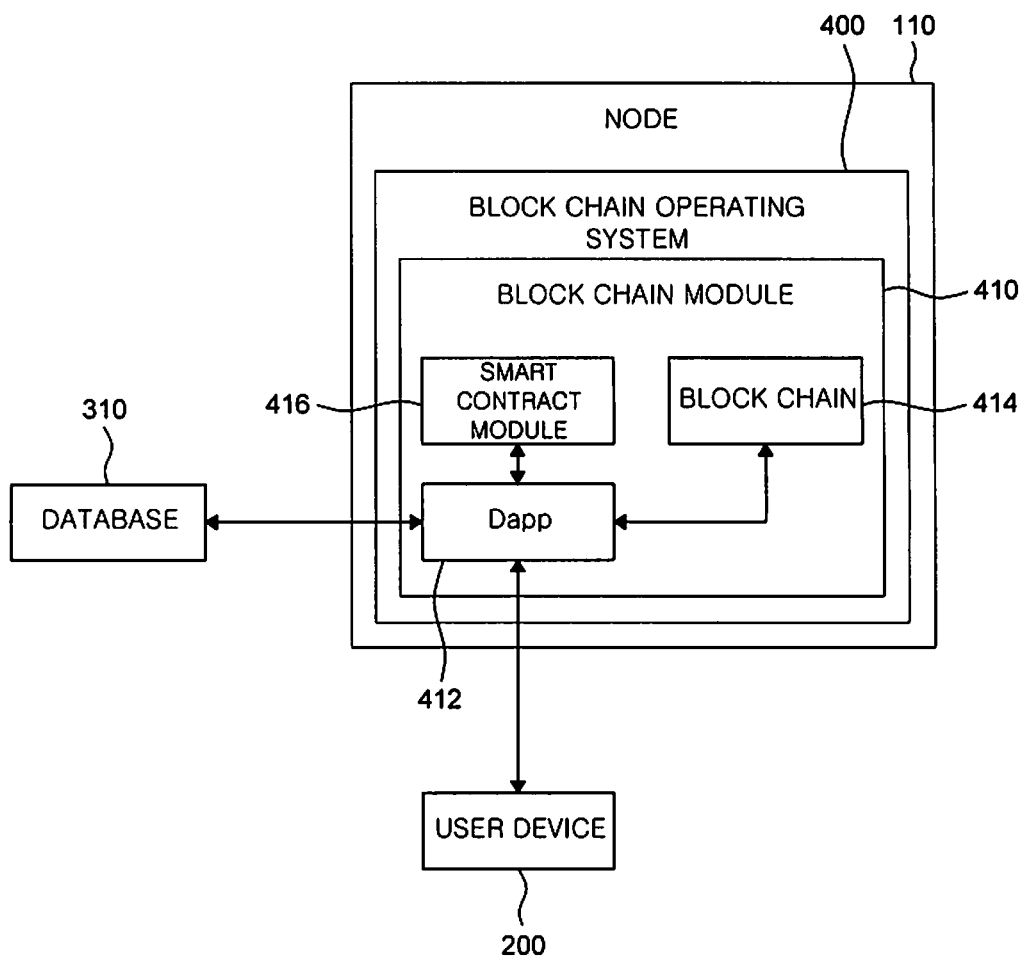
FIG. 4 is a schematic view illustrating a system structure of a node according to an exemplary embodiment of the present disclosure.

FIG. 4 is a schematic view illustrating a system structure of a node according to an exemplary embodiment of the present disclosure.

Referring to FIG. 4, the node 110 may include a block chain operating system 400 and the block chain operating system 400 may include a block chain module 410 corresponding to a logical module related to the block chain.

The block chain module 410 may include a Dapp 412 for providing a block-chain-based service related to the subject data, a block chain 414 which connects blocks including metadata related to the subject data in the form of chain, and a smart contract module 416 for creating a smart contract related to the subject data.

First, the Dapp 412 may provide a block-chain-based service such as creation, modification, transaction, and contract of the subject data. For example, the Dapp 412 may provide a service for creating application document data, modifying the application document data or modifying state information, or creating, checking, or executing the smart contract for filing.

The user device 200 may access the Dapp 412 through the web browser and create or upload the subject data through the Dapp 412.

The Dapp 412 creates first metadata based on the created subject data and creates a first block including the created first metadata to store the created first block in the block chain 414.

The Dapp 412 may create first code information using a hash value of the subject data included in the created first block and a time stamp and stores the created first code information and the subject data in the database 310. The Dapp 412 may designate the first code information as address information of the database 310 in which the subject data is stored. The Dapp 412 may create a block including the first code information and store the created block in the block chain 414.

When the user device 200 which accesses the Dapp 412 through the web browser requests to modify the subject data stored in the database 310, the Dapp 412 accesses the database 310 to acquire the subject data and modify the acquired subject data. For example, the modification of the subject data may refer to an operation of performing at least a part of the document contents for the application document data.

The Dapp 412 creates second metadata based on the modified subject data and creates a second block including the created second metadata to store the created second block in the block chain 414.

The Dapp 412 may create second code information using a hash value of the modified subject data and a time stamp included in the created second block and store the created second code information and the modified subject data in the database 310. The Dapp 412 may designate the second code information as address information of the database 310 in which the modified subject data is stored. The Dapp 412 may create a block including the second code information and store the created block in the block chain 414.

When a request for creating a smart contract for the subject data is received by the user device 200 which accesses the Dapp 412 through the web browser, the Dapp 412 may create a smart contract for the subject data through a smart contract module 416. The smart contract module 416 creates a smart contract code and compiles the created smart contract code to a byte code. Here, the smart contract module 416 may include a tool for creating a smart contract code and a compiler which compiles the smart contract code to a byte code.

The Dapp 412 writes the byte code in the block as a transaction and when the block is created by a miner, stores the created block in the block chain 414 to distribute the created smart contract.

When an operation corresponding to the contract condition for the smart contract is performed by the other user, the Dapp 412 may perform the operation corresponding to the contract contents of the smart contract.

For example, an example that the created smart contract includes a contract condition of depositing a cryptocurrency of a specific amount from the other user and contract contents of transferring an ownership of subject data to the other user who makes a deposit when the contract condition is satisfied will be described. When the deposit of the cryptocurrency of a specific amount corresponding to the contract condition of the smart contract from the other user is confirmed, the Dapp 412 may perform an operation for ownership transfer corresponding to the contract contents of the smart contract. The Dapp 412 updates information on the owner from the ownership related document data stored in the database 310 and creates metadata based on the updated ownership related document data. The Dapp 412 creates the block including the created metadata, stores the created block in the block chain 414 and creates code information using the hash value and the time stamp of the updated ownership related document data included in the created block. The Dapp 412 may designate the created code information as address information of the database 310 in which the updated ownership related document data is stored. The Dapp 412 may create a block including the fulfilled contract contents, the fulfilled contract result, and/or the created code information and store the created block in the block chain 414.

When the request for executing the smart contract is received by the user device 200 which accesses the Dapp 412 through the web browser, the Dapp 412 checks whether to satisfy the contract condition of the smart contract and when the contract condition is satisfied, performs the operation corresponding to the contract contents of the smart contract.

For example, an example that the smart contract includes an electronic wallet address of the patent office server, a contract condition for depositing the cryptocurrency corresponding to the filing fee for the filing to the electronic wallet of the patent office server, and contract contents for performing the filing when the contract condition is satisfied will be described. The Dapp 412 checks whether the cryptocurrency corresponding to the filing fee is deposited to the electronic wallet of the patent office server and when the cryptocurrency is deposited, performs the operation for filing.

In the proposed exemplary embodiment, the operation of the Dapp 412 for the creation, modification, transaction, or contract for the application document data has been described, but the present disclosure is not limited thereto and the similar operation may be performed also in the block-chain-based service using the public administration document data, the confidential document data, or the Internet-of-things data.

As described above, according to the present disclosure, the creation, modification, transaction, or contract of the subject data is performed through the Dapp, so that the user may conveniently create or modify the subject data and conveniently fulfill the transaction or contract with the other user. Further, a processing speed for creating or modifying the subject data may be decreased and the cost for transaction or contract may be saved.

Figure 5:
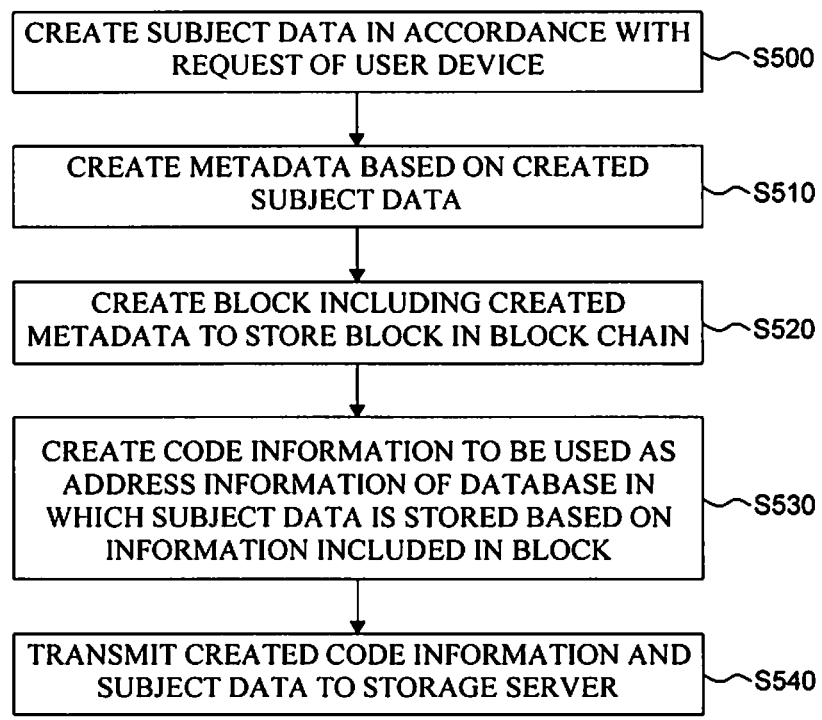
FIG. 5 is a schematic flowchart for explaining a method for managing subject data in a block-chain-based application according to an exemplary embodiment of the present disclosure.

FIG. 5 is a schematic flowchart for explaining a method for managing subject data in a decentralized application according to an exemplary embodiment of the present disclosure. The operations which will be described below may be performed by the decentralized application 120 of the node 110.

Referring to FIG. 5, the decentralized application 120 creates subject data in accordance with the request of the user device 200 in step S500 and creates metadata based on the created subject data in step S510. The decentralized application 120 creates a block including the created metadata to store the block in a block chain in step S520. The decentralized application 120 creates code information to be used as address information of the database 310 in which the subject data is stored, based on the information included in the block in step S530. Here, the code information may be created using a hash value of the subject data included in the block and a time stamp of an event related to the subject data. The decentralized application 120 transmits the created code information and the subject data to the storage server 300 in step S540. The code information may be used as address information of the subject data stored in the database 310.

Figure 6:
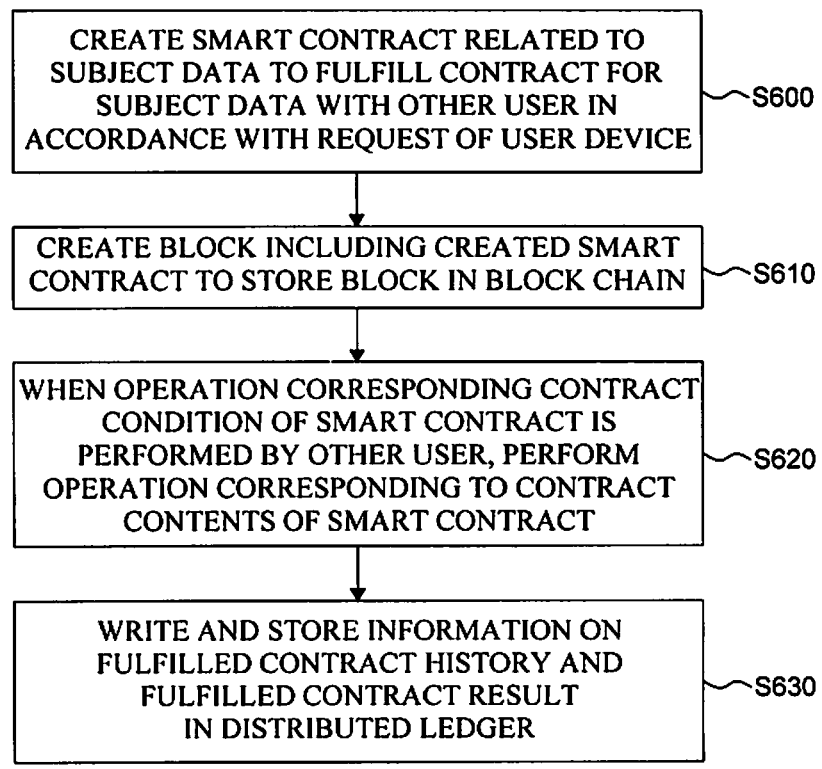
FIG. 6 is a schematic flowchart for explaining a method for fulfilling a contract for subject data in a block-chain-based application according to an exemplary embodiment of the present disclosure.

FIG. 6 is a schematic flowchart for explaining a method for fulfilling a contract for subject data in a decentralized application according to an exemplary embodiment of the present disclosure. Operations which will be described below may be performed by the decentralized application 120 of the node 110.

Referring to FIG. 6, the decentralized application 120 creates a smart contract related to the subject data to fulfill the contract related to the subject data with the other user in accordance with the request of the user device 200 in step S600. The created smart contract may include information on an electronic wallet address for a user of the user device 200, an electronic wallet address of the other user, a contract condition for the subject data, and contract contents to be performed when the contract condition is satisfied.

The decentralized application 120 creates a block including the created smart contract to store the smart contract in a block chain in step S610. By doing this, the smart contract may be distributed to the other nodes connected to the block chain distributed network 100.

When the operation corresponding to the contract condition of the smart contract is performed by the other user, the decentralized application 120 performs an operation corresponding to the contract contents of the smart contract in step S620 and writes and stores information on fulfilled contract contents or a fulfilled contract result in a decentralized ledger in step S630. For example, when the smart contract for a contract such as ownership transfer or right assignment for the subject data is created, the decentralized application 120 creates a block including the created smart contract and distributes the block to the other node connected to the block chain distributed network 100. When an operation corresponding to the contract condition is performed by a specific user, the decentralized application 120 performs the ownership transfer or the right assignment for the subject data to update ownership information or right information. Here, the specific user may be a user corresponding to the contract condition included in the smart contract. The decentralized application 120 creates metadata based on the ownership information or the right information and creates a block including the created metadata to store the block in the block chain. The decentralized application 120 creates code information based on the information included in the created block and designates the created code information as address information of the updated ownership information or right information which is stored in the database 310. The decentralized application 120 may create a block including a fulfilled contract history, a fulfilled contract result, and/or code information and store the created block in the block chain.

Hereinafter, a method for managing subject data using a decentralized ledger in a Dapp will be described with reference to FIG. 7.

Figure 7:
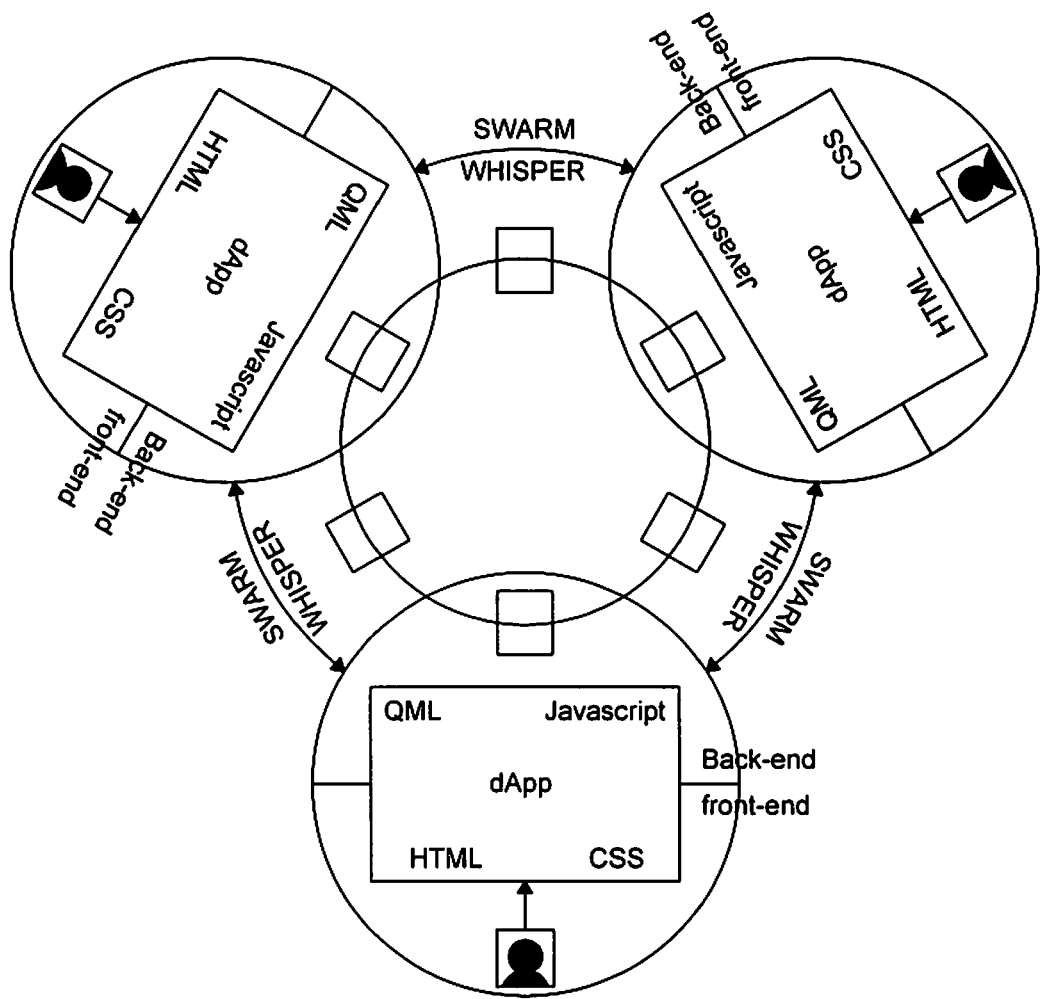
FIG. 7 is an exemplary view for explaining an operation for managing subject data in a Dapp according to an exemplary embodiment of the present disclosure.

FIG. 7 is an exemplary view for explaining an operation for managing subject data in a Dapp according to an exemplary embodiment of the present disclosure. In the proposed exemplary embodiment, an example that the subject data is intellectual property document data will be described.

Referring to FIG. 7, the intellectual property document data may be stored and managed in a centralized database (for example, database 310) of the related art. Metadata of the intellectual property document data may be included in the block to be stored in the block chain. In a header of a block in which the metadata is stored, a hash value of a previous block, intellectual property related information (for example, application/registration/transfer/license grant), a time stamp, or a nounce may be stored. In this case, the decentralized application creates code information using hash information which is an electronic fingerprint of the intellectual property document data and a time stamp and designates the created code information as address information of the centralized database in which the intellectual property document data is stored to connect the block header and the intellectual property document data stored in the centralized database through a network.

The Dapp may be programmed using HTML, CSS, and JavaScript which are internet programming languages of the related art and solidity which is specialized to the ethereum. The Dapp is connected to the block chain using the existing internet protocol and performs data communication using a security protocol such as HTTPS. Such a Dapp may perform P2P communication using SWARM or WHISPER rather than a server-client centered communication method of the related art.

When the metadata for the intellectual property document data is registered in a block of the block chain through the Dapp, the user device may trace or manage the information of the block chain through the Dapp.

Specifically, the Dapp stores the block including the metadata in the block chain and connects the block to the intellectual property document data stored in the centralized database in a hyperlink manner. In this case, the user may freely search and evaluate the metadata stored in the block chain using the Dapp and transfer and manage the intellectual property document data in a P2P manner. Further, an incentive and penalty evaluating system is introduced in the process of registering, transferring, managing, and evaluating the intellectual property document data to improve a quality of the intellectual property document data.

According to various exemplary embodiments, when the subject data is public administration document data, the Dapp creates metadata related to the public administration document data and creates a block including the created metadata to store the created block in the block chain. Here, the metadata may include a document number of the public administration document data, a keyword, or a category.

The Dapp may create code information based on the information included in the block and store the created code information and the public administration document data in the centralized database. In this case, the Dapp designates the code information as address information of the centralized database in which the public administration document data is stored to connect the block in which the metadata is stored to the public administration document data stored in the centralized database. By doing this, the user accesses the Dapp using the user device 200 to freely search and use the metadata stored in the block chain and use and state comments on the administrative service in the P2P manner. Further, an incentive and penalty evaluating system for an administrative institution service and an administration document data is introduced to improve the quality of the administrative service and the administration document data.

According to various exemplary embodiments, when a writing right of public administration document data which is created and registered by a user "A" is transferred to a participant "B", the Dapp may create a smart contract for a contract of transferring a writing right for the public administration document data from "A" to "B". When the electronic signature of the smart contract is completed by "A" and "B", the Dapp creates a block including the created smart contract to store the created block in the block chain. Thereafter, when the approval for the right assignment is completed, the Dapp may perform an operation for right assignment. The approval for the right assignment may be established by exchanging a message or a value which are agreed between "A" and "B" in advance. For example, the operation for the right assignment may include an operation of creating right assignment document data by the Dapp, creating metadata for the created right assignment document data, and then creating a block including the created metadata to store the created block in the block chain, and an operation of creating code information based on information included in the created block by the Dapp, and transmitting the code information and right assignment document data to the public administrative server so as to use the created code information as address information of a centralized database in which the right assignment document data is stored. By doing this, the user may access the Dapp through the user device 200 to freely search or use the metadata stored in the block chain or the public administration document data stored in the centralized database through the Dapp or use an administrative service and evaluate a quality of the service or state comments in the P2P manner.

Hereinafter, a method for managing subject data using a decentralized ledger in a Dapp will be described with reference to FIG. 8.

Figure 8:
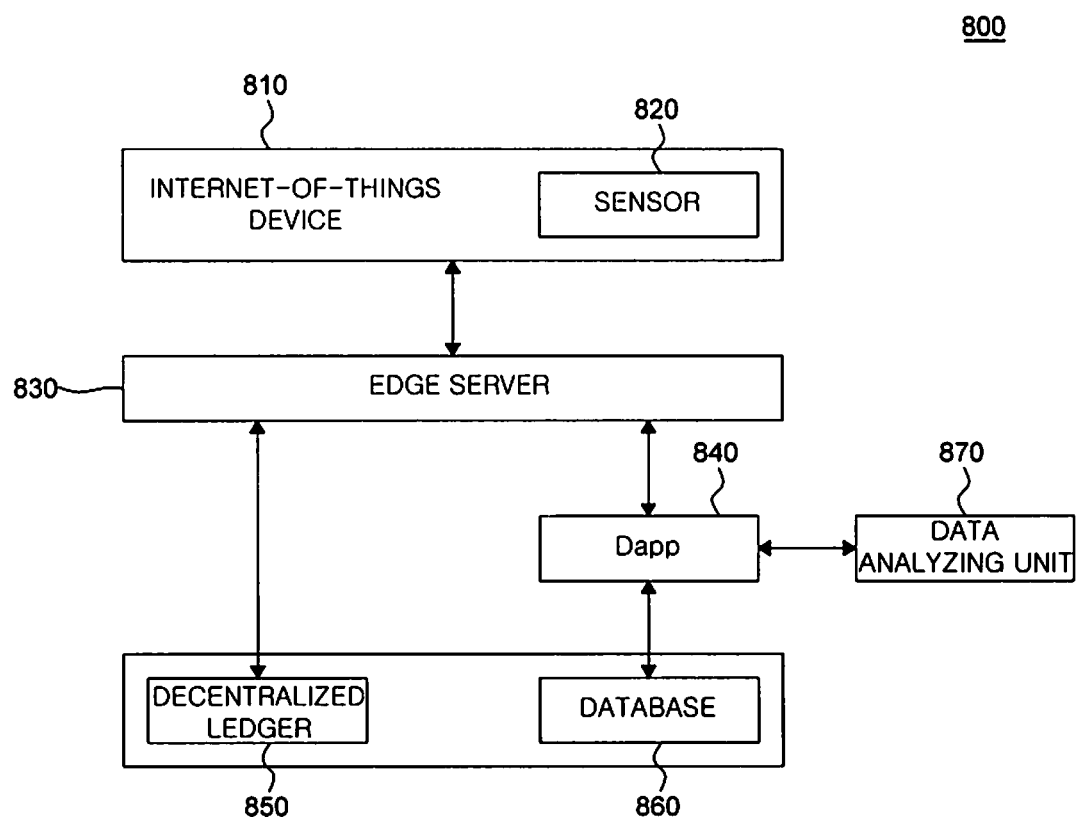
FIG. 8 is a schematic view illustrating a structure of an Internet-of-things data management system according to an exemplary embodiment of the present disclosure.

FIG. 8 is a schematic view illustrating a structure of an Internet-of-things data management system according to an exemplary embodiment of the present disclosure.

Referring to FIG. 8, an Internet-of-things data management system 800 includes an Internet-of-things device 810, a sensor 820 which is a part of the Internet-of-things device 810 and collects primitive sensing data, an edge server 830 which supports data communication between a block chain and the Internet-of-things device 810, a Dapp 840 which provides a service for managing Internet-of-things data, a decentralized ledger (for example, a block chain) 850 which stores metadata of the Internet-of-things data, a database 860 which stores the Internet-of-things data, and a data analyzing unit 870 which analyzes the Internet-of-things data.

The Internet-of-things device 810 may refer to a device which is connected through a network in the form of people, objects, space, and data to support hyper-connected Internet for creating, collecting, sharing, and utilizing data. Data which is treated in the Internet-of-things device 810 may include data which is processed by the sensor 820 and data which is created by a user who uses the Internet-of-things through the Dapp 840.

The sensor 820 may collect sensing data (for example, Internet-of-things data) created in the Internet-of-things device 810. For example, the sensor 820 includes an optical digital sensor and an analog sensor which discern whether there is an object and may be installed in the Internet-of-things device 810 or separately provided. The sensing data collected by the sensor 820 may include all data exchanged between objects and people or between objects. As described above, the sensing data which is collected by the sensor 820 from the Internet-of-things device 810 is primitive data which has a high value of use so that the sensing data is desirably transmitted or received or stored by safe communication in which integrity is ensured.

The edge server 830 may refer to a transmitting server which when there is data request from the Dapp 840 or the data analyzing unit 870, acquires the sensing data stored in the database 860 to transmit the sensing data to the Dapp 840 or the data analyzing unit 870. Since the metadata is stored in the decentralized ledger 850 and a large amount of sensing data is stored in the database 860, the edge server 830 may quickly and effectively access the data in accordance with the request.

The Dapp 840 creates metadata for the sensing data and creates a block including the created metadata to store the block in the block chain. The Dapp 840 creates code information based on the information included in the created block and designates the created code information as address information of the database 860 in which the sensing data is stored. By doing this, the code information which is stored in the block chain may be mapped to the sensing data stored in the database 860 to be connected thereto through the network.

The Dapp 840 writes the information requested by the Internet-of-things device 810 through the edge server 830 in the decentralized ledger 850 and writes information requested by the data analyzing unit 870 through the edge server 830 in the decentralized ledger 850.

The Dapp 840 performs various processing operations in accordance with a request for processing sensing data, a data processing request by the sensor 820, or a data processing or data transmitting request by the data analyzing unit 870.

Specifically, when the processing request for the sensing data acquired from the user of the Internet-of-things device 810 through the sensor 820 is received, the Dapp 840 creates a smart contract for the requested sensing data and fulfills the created smart contract. When the sensing data is received through the edge server 830, the Dapp 840 stores the sensing data in the database 860 and creates metadata for the sensing data. The Dapp 840 creates a block including the created metadata to store the created block in the block chain. The Dapp 840 creates code information based on the information included in the block and designates the created code information as address information of the database 860 in which the sensing data is stored.

According to various exemplary embodiments, in order to periodically and collectively transmit the sensing data collected from the sensor 820, the Dapp 840 may request to transmit data to the sensor 820 through the edge server 830 at every predetermined timing. When the sensing data is received from the sensor 820 at every predetermined timing through the edge server 830, the Dapp 840 stores the sensing data in the database 860 and creates metadata related to the sensing data to write the created metadata in the decentralized ledger 850.

According to various exemplary embodiments, the Dapp 840 may receive a request for predetermined data to collect metadata written in the decentralized ledger and sensing data (for example, raw data) stored in the database 860 through the data analyzing unit 870. Here, the predetermined data may include information indicating when the sensing data is collected. The Dapp 840 creates the smart contract based on the predetermined data and requests the sensing data to the sensor 820 through the edge server 830 when the condition of the created smart contract is satisfied. When the sensing data is received, the Dapp 840 stores the received sensing data in the database 860 and writes the metadata of the sensing data in the decentralized ledger 850. By doing this, the data analyzing unit 870 may access the sensing data stored in the database 860 through the edge server 830.

According to various exemplary embodiments, when there is a processing request on the data which is analyzed by the data analyzing unit 870, the Dapp 840 may create the smart contract for processing analysis data. When the condition of the smart contract is satisfied, the Dapp 840 may request the analysis data to the data analyzing unit 870 through the edge server 830. When the analysis data is received from the data analyzing unit 870 through the edge server 830, the Dapp 840 stores the received analysis data in the database 860 and writes the metadata for the analysis data in the decentralized ledger 850. Specifically, the Dapp 840 creates metadata for the analysis data and creates a block including the created metadata, and then stores the created block in the block chain. The Dapp 840 creates code information based on the information included in the block and designates the created code information as address information of the database 860 in which the analysis data is stored.

The decentralized ledger 850 is a block chain in which block headers are continuously connected and stores a block in which the metadata for the sensing data collected from the sensor 820 is written. The header of the block includes a hash value for the sensing data and a time stamp value and a code value consisting of the hash value and the time stamp value may be used as address information of the database 860 in which the sensing data is stored.

The database 860 may be a centralized database in which a large amount of sensing data is stored.

The data analyzing unit 870 may be a device or platform which analyzes the collected sensing data. The data analyzing unit 870 accesses the Dapp 840 through the edge server 830 so as to access the sensing data stored in the database 860 to create the smart contract. The smart contract which is created as described above may be used to perform a transaction which promptly and quickly transmits information between the Internet-of-things device 810 and the data analyzing unit 870 and between the Internet-of-things device 810 and the decentralized ledger 850.

The data analyzing unit 870 accesses the database 860 through the edge server 830 to analyze the sensing data and then create the analysis data. The data analyzing unit 870 may transmit the request of processing analysis data to the Dapp 840. The analysis data created by the data analyzing unit 870 may be stored in the database 860 through the Dapp 840.

The present disclosure may provide the following effects by the proposed exemplary embodiment.

First, transparency for all data may be provided. Since information on application, registration, a share, a reward, transaction, or grant of license for subject data is shared by all nodes which participate in a block chain distributed network, anyone may track the relationship of right for the subject data and transparently carry out value evaluation and reward.

Further, the cost for data management may be saved. The block chain distributed network may be implemented as a public block chain in which anyone can participate or a private block chain in which a limited expert group participates. Therefore, the participants may voluntarily evaluate various information of the subject data registered in the block chain.

Further, high quality evaluation on the subject data may be performed. When the subject data is evaluated by the participants of the block chain distributed network, the evaluation is reevaluated by the third parties to be recorded as a reputation of each participant. The participants may receive incentives or penalties based on the reputation. By doing this, high quality evaluation may be performed on the open-platform by the incentive or penalty.

Further, the security of the data may be improved. The metadata for the subject data is written in the decentralized ledger so that it is strong against the distributed denial of service (DDoS) attack and the private information confidentiality of the participants of the block chain distributed network may be ensured by the asymmetric key algorithm used in the block chain. Further, since the blocks are connected by a hash so that as the blocks are accumulated, the blocks are reliable, and forgery of data is not allowed. Therefore, integrity of the intellectual property document data may be provided.

Further, the high-speed data processing may be provided. The transaction of the subject data of the related art is centrally operated so that the time delay is not caused by the administrative procedures, but according to the present disclosure, the P2P transaction using a smart contract is allowed so that the fast transaction may be performed. Further, the central system which interworks with the block chain updates the transaction information so that compatibility with the current system may be maintained.

For example, when an event such as application, registration, transfer, grant of license of the intellectual property document data is created, the hash information which is electronic fingerprint information of the intellectual property document data and the time stamp which is time information when the event of the intellectual property document data occurs are coupled to create code information and on-chain (for example, a block of the block chain) and an off-chain (for example, a database of a patent office server) may be connected through the code information. By doing this, the publics may safely and conveniently register and manage the intellectual property document data and make a deal with the intellectual property document data through the block chain in the P2P manner.

Further, according to the hyperlink type block chain, the metadata is written in the block chain and the centralized database stores/manages pool data (that is, the subject data) so that the data may be deleted by deleting the hyperlink.

Generally, the block chain is a platform which provides transparency and integrity. In this case, the integrity refers to a characteristic that all blocks include information of previous blocks and are open to all participant nodes which participate in the same block chain distributed network so that input data cannot be forged or falsificated. That is, the block chain is a P2P network type technology which ensures safe and integritous reliability in the information society where various cyber-attacks are prevalent. However, the forgery and falsification impossibility of the block chain cannot be merely considered as an advantage. It also means that information which is input by simple mistakes cannot be corrected and the transaction which has been executed once cannot be canceled. Further, since the block chain guarantees the transparency in that the participant nodes are publically accessible, there is a concern that the information which should not be open to the public during this process may be exposed.

In the information society where the industrial revolution is taking place with respect to the hyperconnection, various business models require open information sharing and distribution of the authority and the block chain may be an optimized technology in the hyperconnection society through the open innovation. Therefore, a top priority agenda for commercialization of the block chain is to overcome the limitation that the personal information and the sensitive information written in the block chain cannot be destroyed and modified. The technical limitation of the block chain means that it is difficult to easily accept the block chain in an industrial field which handles personal information and information sensitive to the individual.

The limitation may be considered to be even more serious in a public block chain which does not have a central control entity, rather than a private block chain. For example, a scenario which erases data without interfering with the function of the block chain has been identified in the permissioned block chain. However, the public block chain with equal rights and roles per node cannot indiscriminately apply the scenario.

Therefore, according to the present disclosure, pool data is managed by the centralized database of the related art so that data can be modified. Further, only metadata which is the minimum information required to search is written in the block chain in which the data is permanently stored so that the privacy and information invasion problems may be primarily prevented.

In the meantime, the centralized database system of the related art is configured with a client-server network structure and the client may perform the functions of creating, reading, updating, and deleting the data. In order to modify the data in the central server, the client is authenticated by an administrator with a server control authority. The authenticated client is accessible to the data and updates the data by a query statement. In contrast, the block chain may provide only a reading function for searching data on the block chain and a creating function for adding new data onto the block chain.

The characteristic of the existing system and the limitations thereof are improved using the block chain so that safe sharing ecosystem may be built. In other words, according to the present disclosure, the block chain hierarchy handles only the metadata and manages the pool data in the form of off-chain based on the metadata.

In this case, the block chain serves as a pointer for the off-chain and a user having an authority may immediately process various information. Further, various actual sensitive information is not directly input to the hyperlink type block chain so that the data modification/deletion impossibility of the block chain of the related art may be solved. Further, the data may be destroyed by the database hierarchy.

The block chain is a secure channel which supports the subjects who use the database to share and access the information so that the block chain may serve as a transaction hierarchy which shares a database storing various data including personal information like one security system. By doing this, the information manipulation and modified matters of the database which is maintained by an off-chain are broadcasted onto the block chain and the important information is shared while consistently demonstrating the validity.

In other words, according to the present disclosure, in order to solve the scalability problem which is pointed out as a limitation of the block chain, only the metadata is stored in the block chain and the block chain and the existing centralized database are connected to provide an open platform which may check, manage, and evaluate transparent and integritous data information anytime and anywhere. Therefore, the public may participate in the management process of the subject data in the block-chain-based distributed network in a P2P manner and the system efficiency may be improved.

The apparatus and the method according to the exemplary embodiment of the present invention may be implemented as a program command which may be executed by various computers to be recorded in a computer readable medium. The computer readable medium may include solely a program command, a data file, and a data structure or a combination thereof.

The program commands recorded in the computer readable medium may be specifically designed or constructed for the present invention or those known to those skilled in the art of a computer software to be used. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high-level language code which may be executed by a computer using an interpreter.

The above-described hardware device may operate as one or more software modules in order to perform the operation of the present invention and vice versa.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A block-chain-based subject data management method, the method comprising:
creating subject data on a node in accordance with a request of a user device;
creating first metadata related to the subject data;
creating a first block including the first metadata;
storing the first block in a block chain included in the node;
creating a first code by coupling hash information of the subject data and a time stamp when the subject data is created;
storing the first code in the node; and
transmitting the subject data and the first code to an off-chain database,
wherein the subject data is stored in the off-chain database,
creating second metadata related to a modified subject data when the subject data stored in the off-chain database is modified;
creating a second block including the created second metadata to store the second block in the block chain;
creating a second code based on hash information of the modified subject data;
storing the created second code in the node; and
transmitting the modified subject data and the second code to the off-chain database,
wherein the first code stored in the node is mapped to an address of the off-chain database in which the subject data is stored and the second code stored in the node is mapped to an address of the off-chain database in which the modified subject data is stored.

2. The method according to claim 1, wherein when the subject data is modified, the address information of the off-chain database in which the modified subject data is stored is modified to the address information including the second code.

3. The method according to claim 1, further comprising:
creating a first smart contract related to right assignment or ownership transfer with respect to the subject data;
creating a third block including the created first smart contract to store the third block in the block chain;
performing an operation for the right assignment or ownership transfer corresponding to the contract contents of the smart contract when an operation corresponding to the contract condition of the first smart contract is performed; and
creating a fourth block including information on a fulfilled contract history or a fulfilled contract result of the first smart contract to store the fourth block in the block chain.

4. The method according to claim 3, wherein the first smart contract includes information on an electronic wallet address of a user, the contract condition, and the contract contents performed when the contract condition is satisfied and the first smart contract further includes information on the electronic wallet address of a contract subject.

5. The method according to claim 1, further comprising:
inquiring a second smart contract for a contract related to the subject data;
performing an operation corresponding to the contract contents of the second smart contract when an operation corresponding to the contract condition of the inquired second smart contract is performed; and
creating a fifth block including information on a fulfilled contract history or a fulfilled contract result of the second smart contract to store the fifth block in the block chain.

6. A block-chain-based subject data management apparatus, comprising:
a communication unit;
a storing unit configured to store a block chain; and
a processor which is configured to be operably connected to the communication unit and the storing unit, wherein the processor is configured to:
create subject data in accordance with a request of a user device;
create first metadata related to the subject data;
create a first block including the first metadata;
store the first block in a block chain in the storing unit;
create a first code by coupling hash information of the subject data and a time stamp when the subject data is created;
store the first code in the storing unit;
transmit the subject data and the first code to an off-chain database,
wherein the subject data is stored in the off-chain database, create second metadata related to a modified subject data when the subject data stored in the off-chain database is modified;
create a second block including the created second metadata to store the second block in the block chain;
create a second code based on hash information of the modified subject data;
store the created second code in the node; and
transmit the modified subject data and the second code to the off-chain database,
wherein the first code stored in the node is mapped to an address of the off-chain database in which the subject data is stored, and the second code stored in the node is mapped to an address of the off-chain database in which the modified subject data is stored.

7. The apparatus according to claim 6, wherein when the subject data is modified, the address information of the off-chain database in which the modified subject data is stored is modified to the address information including the second code.

8. The apparatus according to claim 6, wherein the processor is further configured to:
create a first smart contract related to right assignment or ownership transfer with respect to the subject data;
create a third block including the created first smart contract to store the third block in the block chain;
perform an operation for the right assignment or ownership transfer corresponding to the contract contents of the smart contract when an operation corresponding to a contract condition of the first smart contract is performed; and
create a fourth block including information on a fulfilled contract history or a fulfilled contract result to store the fourth block in the block chain.

9. The apparatus according to claim 8, wherein the first smart contract includes information on an electronic wallet address of a user, the contract condition, and the contract contents performed when the contract condition is satisfied and the first smart contract further includes information on the electronic wallet address of a contract subject.

10. The apparatus according to claim 6, wherein the processor is further configured to:
inquire a second smart contract for a contract related to the subject data;
perform an operation corresponding to the contract contents of the second smart contract when an operation corresponding to the contract condition of the inquired second smart contract is performed; and
create a fifth block including information on a fulfilled contract history or a fulfilled contract result of the second smart contract to store the fifth block in the block chain.

* * * * *